April 2, 1963 L. PĚRAS 3,084,002

BRAKING POWER DISTRIBUTORS

Filed Feb. 6, 1961 2 Sheets-Sheet 1

Inventor

Lucien Peras

By Stevens Davis Miller & Mosher

Attorneys

April 2, 1963 L. PÉRAS 3,084,002

BRAKING POWER DISTRIBUTORS

Filed Feb. 6, 1961 2 Sheets-Sheet 2

Inventor

Lucien Peras

By Stevens Davis Miller & Mosher

Attorneys 3,084,002
United States Patent Office
Patented Apr. 2, 1963

3,084,002

BRAKING POWER DISTRIBUTORS

Lucien Péras, Billancourt, Seine, France, assignor to Regie Nationale des Usines Renault, Billancourt, France Filed Feb. 6, 1961, Ser. No. 87,452
Claims priority, application France Oct. 4, 1960
4 Claims. (Cl. 303—22)

In certain vehicles and notably in transport vehicles it is a frequent occurrence when the vehicle is empty to have an unequal load distribution, that is, a very low weight at the rear in comparison with the weight supported by the front axle.

If a normal braking force is applied under normal load conditions an efficient braking force must be applied to the front axle due to the greater weight supported by this axle. Now, the distribution of the braking power is set once and for all, by construction, at the factory on the basis of a loaded vehicle, and it is obvious that when the latter is empty the braking power applied to the front axle is particularly high. At low speed a considerable effort exerted by the driver's foot on the brake pedal may even cause the rear portion of the vehicle to rise or jump, and thus reduce or suppress the road adherence of the rear wheels.

It is a specific object of the present invention to provide a variable-power distributor for braking systems of vehicles, notably for trucks and other utility or transport vehicles, whereby the drawback set forth hereinabove is definitely avoided. In an alternate embodiment of this distributor, the braking effort transmitted to all the wheels of the vehicle is varied automatically as a function of the load transported by the vehicle.

In all cases, the essential component of the variable-power distributor is a pressure limiter. The pressure limiter according to the present invention comprises a throttling or closing device inserted in the brake control fluid line. This device becomes operative in case of a brake application, but its action can be limited or even suppressed by means of adjustment members. By properly setting these adjustment members it is possible not only to select the desired pressure to be delivered by the limiter to the brake cylinders, but also to by-pass the limiter when the load exceeds a predetermined minimum value.

When the variable-power distributor is used as an anti-pitch device the pressure limiter is operative only on the front wheel brakes and reacts to the variations in the vertical movement and rebound of the rear portion of the vehicle as a function of the load. This pressure limiter may be disposed at any suitable location at the rear of the vehicle, for example between the two semi-axles in case of a front-drive automotive vehicle, or between the chassis frame and the rear axle in the case of a vehicle having rear drive wheels, provided that sufficient space is available for the operation of the apparatus either directly or through the medium of mechanical, hydraulic or pneumatic members and means such as levers, reducing gears or relay means, for example. This space depends on the vertical movements of the body which depend in turn on the load carried by the vehicle.

The adjustable member limiting or preventing the actuation of the throttling or closing device is adjusted with a view to limit the pressure transmitted to the front brakes to the desired value, and to neutralize the action of the limiter to a predetermined load of the vehicle, this load representing the weight carried by the rear axle above which there is no appreciable risk of jumping or loss of wheel adherence. Above this load value, the pressure transmitted to the front brakes increases gradually to the value corresponding to the initial adjustment as recommended by the manufacturer.

In order to afford a clearer understanding of this invention and of the manner in which the same may be carried out in practice, reference will now be made to the accompanying drawings illustrating diagrammatically by way of example typical embodiments of the invention. In the drawings.

The present invention is applicable to all braking systems of the fluid-operated type. Therefore, it has not been deemed necessary to show the details of the brakes themselves and of their usual control means in the figures.

Figures 1, 2:
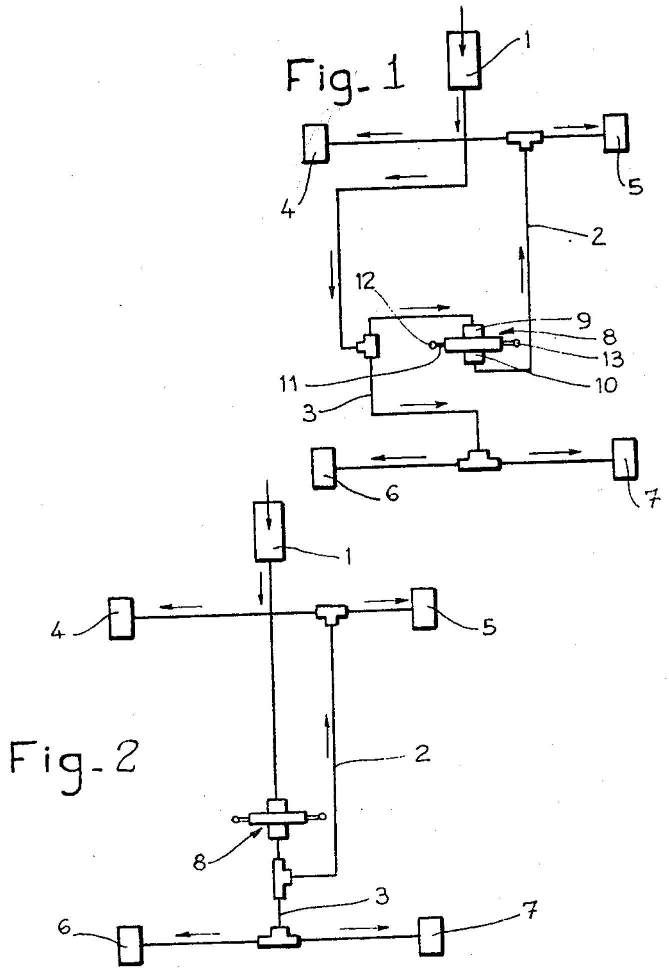
FIGURE 1 is a similar view showing a variable-power braking system equipped with the distributor of this invention which operates as an anti-jump device.
FIGURE 2 is a diagrammatic view showing a variable-power braking system wherein the pressure limiter controls simultaneously the brake application to all the wheels of the vehicle.

FIGURE 1 illustrates a variable-power braking system distributor according to this invention, whereby the inconvenience of rear jumping or loss of adherence of the rear wheels usually observed under no-load or moderate-load conditions with conventional systems is avoided. The distributor according to this invention differs from the known systems by the mounting and the operation of a pressure limiter 8 of which a typical embodiment will be described presently in detail. This pressure limiter is interposed by means of pipe couplings or like fittings 9, 10 in the line 2 delivering fluid under pressure to the front wheel brakes 4, 5 in case of a brake application. This limiter comprises a movable control member 11 provided at its outer end with a coupling yoke 12, another coupling yoke 13 being formed at the opposite end of the pressure limiter, as shown notably in FIG. 3. These coupling yokes 12, 13 are connected to the vehicle at two different points of which the relative spacing varies as a function of the magnitude of the vehicle load. According to the position of the control member 11 and when fluid under pressure is delivered through the coupling sleeve 9, the pressure limiter closes, reduces or opens completely the cross-sectional passage area available for the fluid toward the opposite coupling or fitting 10 and therefore to the front brakes 4 and 5.

The pressure limiter is so mounted on the rear axle that it closes or reduces the cross-sectional passage area available for the fluid in the direction of the front brakes as long as the load or live weight supported by the rear portion of the vehicle remains below a predetermined value, and that above this minimum value it permits the passage of fluid at a rate increasing with the magnitude of the load or live weight, until a maximum value is attained.

Figure 3:
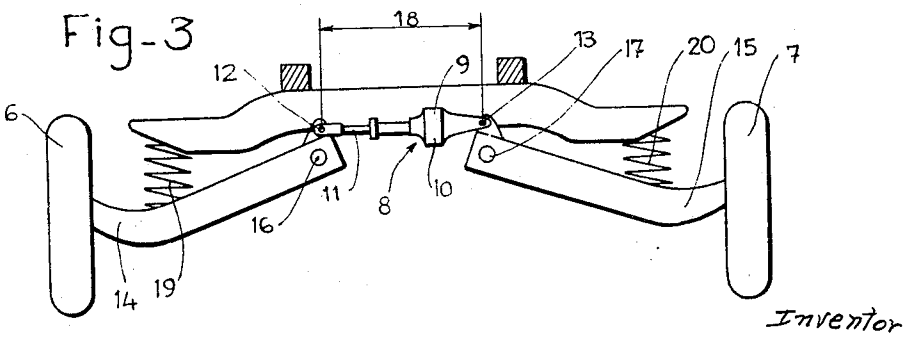
FIGURE 3 is a diagrammatic front elevational view showing a typical mounting of the pressure limiter on the rear axle of a vehicle.

FIGURE 3 of the drawings illustrates a typical example of the manner in which the pressure limiter may be mounted on the rear portion of a vehicle. In this example the pressure limiter 8 is mounted between the two rear semi-axles 14, 15 of a front-drive automotive vehicle, these axles being adapted to pivot the one about a pin 16 and the other about a pin 17. Each coupling yoke 12 or 13 of the pressure limiter is articulated on the semi-axles 14, 15, and each pivot axis is located at the end of a lever arm represented by the straight line connecting the pivot axis to the axis of pin 16 (or 17), the other arm consisting of that portion of the relevant semi-axle 14 (or 15) which extends from the axis 16 (or 17) to the wheel 6 (or 7). These pivot axes are so positioned that the distance 18 measured between these axes decreases as the live weight or vehicle loading increases, and vice versa, the movable control member 11 moving in or out to actuate the throttle or flow-limiting device of the pressure limiter in the manner already set forth hereinabove.

Of course, the suspension of the vehicle may be of any known and suitable type, provided only that the action exerted by the pressure limiter as a function of the live weight corresponds to the above definition. Thus, for example, the compression springs 19 and 20 may be replaced by torsion bars connected to the two semi-axles at the aforesaid pivot points 16 and 17.

The source of fluid under pressure 1 may be of any known and suitable type such as, for example, a master cylinder in the case of a hydraulic braking system.

It is also possible to utilize the variable-power distributor of this invention for varying the braking effort applied to all the wheels of the vehicle as a function of the vehicle live weight or loading. FIG. 3 illustrates a typical diagram of this specific mounting, wherein the pressure limiter 8 is interposed in the pipe line supplying control fluid to all the wheel brakes of the vehicle and may be mounted by means of its coupling yokes 12, 13 at any two points of which the relative distance varies as a function of the live weight of the vehicle.

Figure 4:
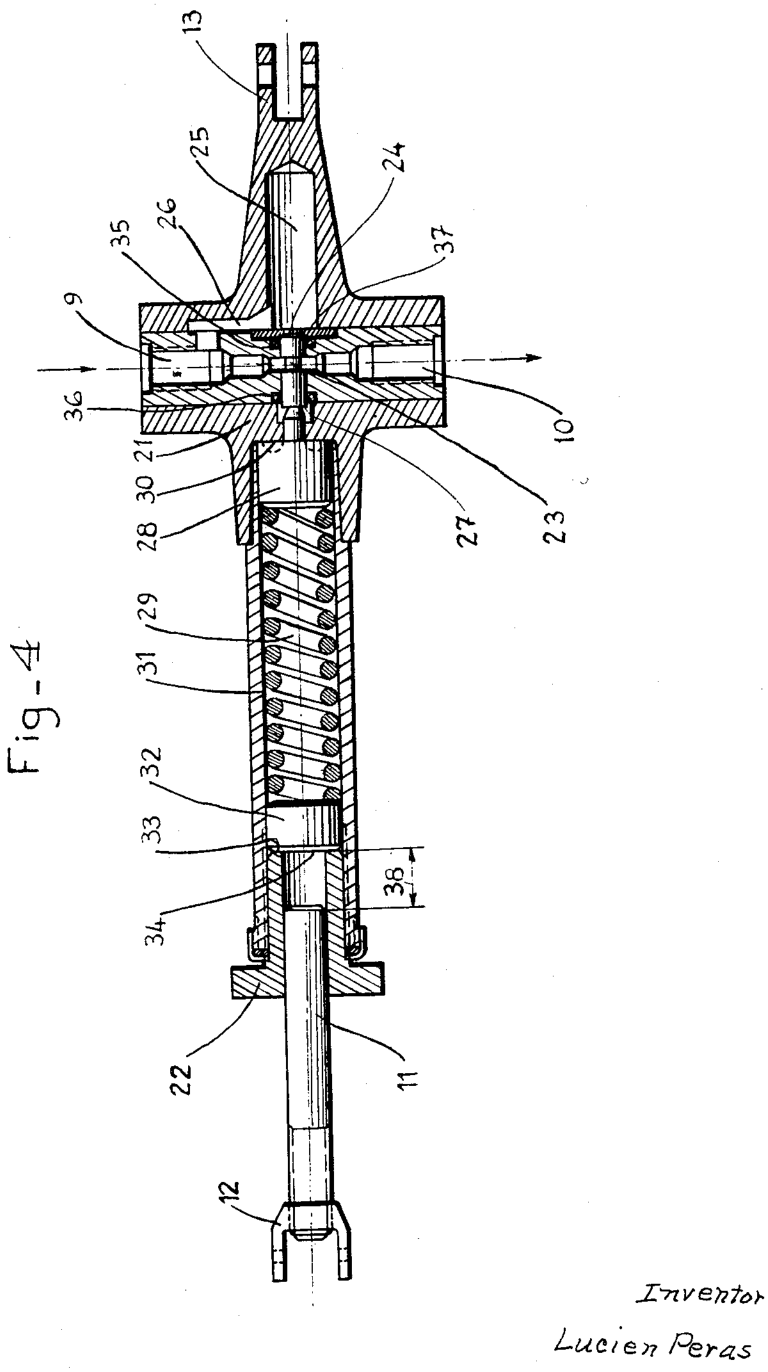
FIGURE 4 is a fragmentary axial section showing a typical embodiment of a pressure limiter constructed according to the teachings of this invention.

A typical form of embodiment of the pressure limiter of this invention is shown in fragmentary longitudinal section in FIG. 4.

This pressure limiter comprises a body 21 having at one end fastening means in the form of a yoke 13. At its opposite end the body 21 has adjustably screwed therein or thereon a socket 22. A control member 11 carries on its outer end another coupling member in the form of a yoke 12, this control member consisting of a plain rod slidably fitted in the socket 22, as shown. A cylindrical member 9 tightly fitted in the body 21, constitutes a pipe fitting through which the pressure limiter can be connected to a source of pressure fluid (not shown). Opposite to this member 9 is another cylindrical pipe fitting 10 through which the body 21 may be connected to one or more pipe lines (not shown) to the brakes. If desired, the two fittings 9 and 10 may form a single member, as shown. A cylindrical slide valve 23 is slidably fitted in a transverse bore formed between the pipe fittings 9 and 10, and adapted to move axially and thus open or close partially or completely the circulation of fluid between the fittings 9 and 10. The end face 24 of slide valve 23 registers with a chamber 25 communicating through a passage 26 with the pipe fitting 9 connected to the supply of pressure fluid. The opposite face 27 of the cylindrical slide valve 23 engages an axial stud projecting from a sliding push member 28 resiliently urged by a compression spring 29 housed in the body 21 against the bottom face 30 of a hollow cylindrical extension 31 of the hollow body 21, this bottom face 30 being parallel to the face 27.

The coil spring 29 is compressed between the push member 28 and another sliding push member 32, both push members being slidably fitted in the same tubular extension 31 of the body 21. The outer face 34 of push member 32 (that is, the face opposite to that engaged by the spring 29) is checked by the inner edge 33 of socket 22. This face 34 registers therefore with the inner end of the control rod 11.

Piston packings or like suitable sealing rings 35, 36 are fitted between the slide valve 23 and the transverse bore in which it is fitted.

Finally, a washer 37 formed with a relatively small central orifice of a diameter inferior to that of the relevant face 24 of the slide valve limits the slide valve movements in the direction of the chamber 25.

Now the operation of the pressure limiter of this invention will be described with reference to FIG. 4 and to its mounting in an anti-jump system of the type defined hereinabove and illustrated in FIGS. 1 and 3 of the drawings.

When the vehicle is empty, the distance 18 (see FIG. 3) is maximum and a gap 38 (FIG. 5) obtains between the inner end of control member 11 and push member 32. Thus, the tension of spring 29 and, therefore, the effort exerted by this spring on the slide valve 23 through the medium of the inner push member 28 is at its minimum value. If, under these conditions, fluid under pressure is delivered to the limiter 8 through the fitting 9, this fluid will flow laterally through the passage 26 and thus exert a pressure on the face 24 of slide valve 23, to move the latter in the direction of the push member 32 and compress the spring 29.

According to the initial setting of spring 29 (which is effected by screwing the socket 22 in or out in the body extension 31), the slide valve 23 will close or reduce more or less the cross-sectional passage area available for the fluid flowing to the opposite or outlet fitting 10 and therefore to the front brakes 4, 5 (FIG. 1).

When the vehicle loading is gradually increased, the pressure limiter 8 continues to operate exactly in the same manner until the distance 18 (FIG. 3) is reduced sufficiently to cause the inner end of the control member 11 to move the push member 32 and thus compress the spring 29. This moment may be set at will for each vehicle by adjusting the length of the shank of the control rod 11, that is, by selecting the maximum adequate space 38 when the vehicle is empty. When the member 11 and push member 32 start compressing the spring 29, the force to be overcome by the slide valve 23 for moving toward the outer push member 32 increases. As the slide valve displacement is thus limited, the cross-sectional area of the passage available for the fluid will be greater as the spring 29 will be more compressed and the braking effort applied to the front wheels will increase in proportion with the useful load carried by the rear axle of the vehicle.

When the variable-power distributor for braking systems of this invention is used not as an anti-pitch device but as an apparatus acting on all the wheels of the vehicle, the operation of the pressure limiter remains unchanged. However, the only difference resides in the fact that the braking effort will increase in all the wheels with the vehicle loading either on the rear axle, or on a group of axles, or on the various axles, according to the position of the pressure limiter.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In an automotive vehicle having a fluid braking system, a variable power distributor for the braking system comprising a pressure limiter mounted on the vehicle and connected to the fluid braking system, said pressure limiter including a body member having an inlet end for brake control fluid and an outlet end, a cylindrical slide valve arranged transversely in the body member between the inlet end and the outlet end and controlling the fluid passage between said ends, said valve having opposing end faces, said body member having laterally projecting side portions, one of said side portions terminating in an anchoring means and said side portion having a chamber in communication with one of the end faces of the valve, said chamber being in communication through a passage with the inlet end for the brake control fluid so that the upstream pressure of the brake control fluid acts on said end face of the valve, the other of said side portions being a socket, a tubular member adjustably fitted in the socket and projecting axially therefrom, a spring housed in said tubular member and acting on the other end face of the valve, a rod slidably disposed in the tubular member and extending outwardly therefrom and adapted to compress the spring, said rod having an inner end spaced a pre-determined distance from the spring when the vehicle is empty so that the rod will start to compress the spring to act on the valve only when the load exceeds a pre-determined minimum value, said rod having an outer end terminating in an anchoring means, both of said anchoring means being pivotally connected to the vehicle at two different points of which the relative spacing varies as a function of the magnitude of the vehicle loading whereby the valve controls the fluid passage between the inlet and outlet ends as a function of the weight of the vehicle.

2. A variable power distributor according to claim 1, wherein said spring is located and pre-stressed between two push members, one of said push members being disposed between the rod and the spring and held in spaced relation with the inner end of the rod and the other of said push members being disposed between the spring and the valve.

3. A variable power distributor according to claim 1, wherein said pressure limiter is so arranged and connected that it is responsive to the load supported by the rear axle of the vehicle and that it will close, reduce or open the brake fluid passage to the wheel brake cylinders of the front axle of the vehicle.

4. A variable power distributor according to claim 1, wherein the pressure limiter is so arranged and connected that it is responsive to the load supported by the rear axle of the vehicle and that it will close, reduce or open the brake fluid passage to the wheel brake cylinders of the front axle and the rear axle of the vehicle.

References Cited in the file of this patent

UNITED STATES PATENTS

| | | |
|---|---|---|
| 717,286 | Sauvage | Dec. 30, 1902 |
| 2,219,786 | Olley | Oct. 29, 1940 |